United States Patent
Pekovic et al.

(10) Patent No.: US 11,193,428 B2
(45) Date of Patent: Dec. 7, 2021

(54) SYSTEM AND METHOD FOR MONITORING COMPONENT INTEGRITY DURING ENGINE OPERATION

(71) Applicant: PRATT & WHITNEY CANADA CORP., Longueuil (CA)

(72) Inventors: Tatjana Pekovic, St-Lambert (CA); Sean McCarthy, Beaconsfield (CA); Andrew Ghattas, La Prairie (CA)

(73) Assignee: PRATT & WHITNEY CANADA CORP., Montreal (CA)

( * ) Notice: Subject to any disclaimer, the term of this patent is extended or adjusted under 35 U.S.C. 154(b) by 351 days.

(21) Appl. No.: 16/263,337

(22) Filed: Jan. 31, 2019

(65) Prior Publication Data

US 2020/0248634 A1    Aug. 6, 2020

(51) Int. Cl.
| | |
|---|---|
| *F02C 9/28* | (2006.01) |
| *G06F 13/38* | (2006.01) |
| *B64D 45/00* | (2006.01) |
| *G01M 15/04* | (2006.01) |
| *G06F 9/30* | (2018.01) |
| *G01M 15/14* | (2006.01) |

(52) U.S. Cl.
CPC ............. *F02C 9/28* (2013.01); *G01M 15/046* (2013.01); *G01M 15/14* (2013.01); *G06F 9/3004* (2013.01); *G06F 13/385* (2013.01); *B64D 2045/0085* (2013.01); *F05D 2230/72* (2013.01)

(58) Field of Classification Search
CPC .. G06F 13/385; F02C 9/28; B64D 2045/0085
See application file for complete search history.

(56) References Cited

U.S. PATENT DOCUMENTS

| | | |
|---|---|---|
| 4,135,246 A | 1/1979 | McMannis |
| 6,408,258 B1 | 6/2002 | Richer |
| 8,600,611 B2 | 12/2013 | Seize |

(Continued)

FOREIGN PATENT DOCUMENTS

EP    2390742 A1    11/2011

OTHER PUBLICATIONS

European Search Report of Application No. 20154966.4 dated Jun. 8, 2020.

*Primary Examiner* — Zachary K Huson
(74) *Attorney, Agent, or Firm* — Norton Rose Fulbright Canada LLP (57) ABSTRACT

Methods and systems for monitoring component integrity during operation of an engine are provided. Usage data associated with a period of operation of the engine is obtained at an engine controller. The engine controller has assigned thereto a first trust level. A first indication of the usage data is transmitted from the engine controller to a first presentation device forming part of a first communication path, which has assigned thereto a second trust level lower than the first trust level. A second indication of the usage data is transmitted from the engine controller to a second presentation device forming part of a second communication path, which is independent from the first communication path and has assigned thereto the second trust level. The trust level of the first and second communication paths is elevated by having the usage data transmitted through the first and second independent communication paths.

20 Claims, 4 Drawing Sheets

(56) References Cited

U.S. PATENT DOCUMENTS

| | | | |
|---|---|---|---|
| 8,700,363 | B2 | 4/2014 | Heinzerling |
| 8,723,693 | B1 | 5/2014 | Cahoon |
| 9,081,935 | B2 | 7/2015 | Heinzerling |
| 9,156,543 | B2 | 10/2015 | De Rammelaere et al. |
| 9,205,931 | B1 | 12/2015 | Kawalkar |
| 9,573,682 | B2 | 2/2017 | Heusinger et al. |
| 9,672,100 | B2 | 6/2017 | Gauthier |
| 9,753,894 | B2 | 9/2017 | Heinzerling |
| 10,229,016 | B2 | 3/2019 | Freydel et al. |
| 10,235,523 | B1 | 3/2019 | Keller, III et al. |
| 10,304,414 | B2 | 5/2019 | Bargh et al. |
| 2016/0178464 | A1* | 6/2016 | Burns ............... F01D 17/02 73/112.01 |
| 2017/0267361 | A1* | 9/2017 | Longley, Jr. ........... B64D 15/12 |
| 2017/0324437 | A1* | 11/2017 | Ruttler ............. A61B 5/02438 |
| 2018/0150075 | A1 | 5/2018 | Ramos Salas et al. |
| 2018/0162549 | A1 | 6/2018 | Ziarno |
| 2019/0032573 | A1 | 1/2019 | Priat et al. |

\* cited by examiner

302 — Obtaining, at an engine controller, usage data associated with a period of operation of an engine 304 — Transmitting a first indication of the usage data from the engine controller to a first presentation device forming part of a first communication path 306 — Transmitting a second indication of the usage data from the engine controller to a second presentation device forming part of a second communication path independent from the first communication path

SYSTEM AND METHOD FOR MONITORING COMPONENT INTEGRITY DURING ENGINE OPERATION

TECHNICAL FIELD

The application relates generally to engine safety, and more particularly to monitoring component integrity during engine operation.

BACKGROUND OF THE ART

Rotating components in gas turbine engines experience various forms of fatigue, including so-called "low cycle fatigue" and "creep damage". Component fatigue can occur as a result of operation at high temperatures, of repeated plastic deformation of components during use, and the like. Fatigued components can eventually break or otherwise fail, and aircraft components can be subjected to regulations requiring preventative maintenance or replacement of components to avoid fatigue-related failure.

Existing approaches for monitoring component fatigue require sophisticated hardware, which may not be available on many simple aircraft. Operators instead rely on simple counting statistics, such as flight time or distance, which can overestimate the wear on components and lead to early replacement or maintenance.

As such, there is room for improvement.

SUMMARY

In accordance with a broad aspect of the invention, there is provided herein a method for monitoring component integrity during operation of an engine. Usage data associated with a period of operation of the engine is obtained at an engine controller, the engine controller having assigned thereto a first trust level. A first indication of the usage data is transmitted from the engine controller to a first presentation device forming part of a first communication path, the first communication path having assigned thereto a second trust level lower than the first trust level. A second indication of the usage data is transmitted from the engine controller to a second presentation device forming part of a second communication path independent from the first communication path and having assigned thereto the second trust level. The trust level of the first and second communication paths is elevated by having the usage data transmitted through the first and second independent communication paths.

In accordance with another broad aspect, there is provided a system for monitoring component integrity during operation of an engine. The system comprises a processing unit and a non-transitory computer-readable medium coupled to the processing unit. The computer-readable medium has stored thereon instructions executable by the processing unit for: obtaining, at an engine controller, usage data associated with a period of operation of the engine, the engine controller having assigned thereto a first trust level; transmitting a first indication of the usage data from the engine controller to a first presentation device forming part of a first communication path, the first communication path having assigned thereto a second trust level lower than the first trust level; and transmitting a second indication of the usage data from the engine controller to a second presentation device forming part of a second communication path independent from the first communication path and having assigned thereto the second trust level. The trust level of the first and second communication paths is elevated by having the usage data transmitted through the first and second independent communication paths.

In accordance with a further broad aspect, there is provided an assembly for monitoring component integrity of an engine. The assembly comprises a first communication link. The first communication link has assigned thereto a first trust level. The assembly further comprises a second communication link. The second communication link is independent from the first communication link and has assigned thereto the first trust level. The assembly further comprises an engine controller coupled to the first and second communication links. The engine controller has assigned thereto a second trust level higher than the first trust level. The engine controller is configured for: monitoring usage data during operation of the engine; transmitting a first indication of the usage data over the first communication link; and transmitting a second indication of the usage data over the second communication link

DESCRIPTION OF THE DRAWINGS

Reference is now made to the accompanying figures in which.

DETAILED DESCRIPTION

Components in aircraft, for example in aircraft engines, are subject to a variety of regulatory standards. One group of regulatory standards relates to component integrity: regulations may require that a particular component of an aircraft or aircraft engine be replaced after a predetermined period of time, after the component has been subjected to a predetermined number of rotations, cycles, flight miles, or the like. Modern aircraft engines incorporate electronic engine control systems (EECS) which are equipped with a variety of sensors, allowing for automatic measurement of fatigue cycle counts for components of the engine, and which can report usage data relating to the components.

In addition, communication systems in aircraft can be subject to regulations which assign a "trust level" to each component in a communication network (e.g., a Functional Development Assurance Level, or FDAL). In order to communicate critical information (e.g., which can be indicative of catastrophic failure, severe failure, or other hazardous conditions), components with a high trust level are required. Less critical information (e.g., which can be indicative of major or minor failure, or without any safety effect) can be communicated using components with lower trust levels. One example of these regulations can be found in the Society of Automotive Engineers (SAE) Aerospace Recommended Practice (ARP) 4754A.

Aircraft engines are typically provided with EECS having a sufficiently-high trust level for electronically reporting usage data. However, smaller and less sophisticated aircraft can lack the requisite equipment for providing operators with the usage data measured by the EECS: the communication systems used to relay the usage data measured by the EECS to an operator can be of a too-low trust level, and thus do not respect established regulatory standards. The present disclosure relates to methods and systems for monitoring the integrity of components of an aircraft, including of aircraft engines, which respect established regulatory standards despite at least some of the usage data reporting equipment not having a suitably high trust level.

Figure 1:
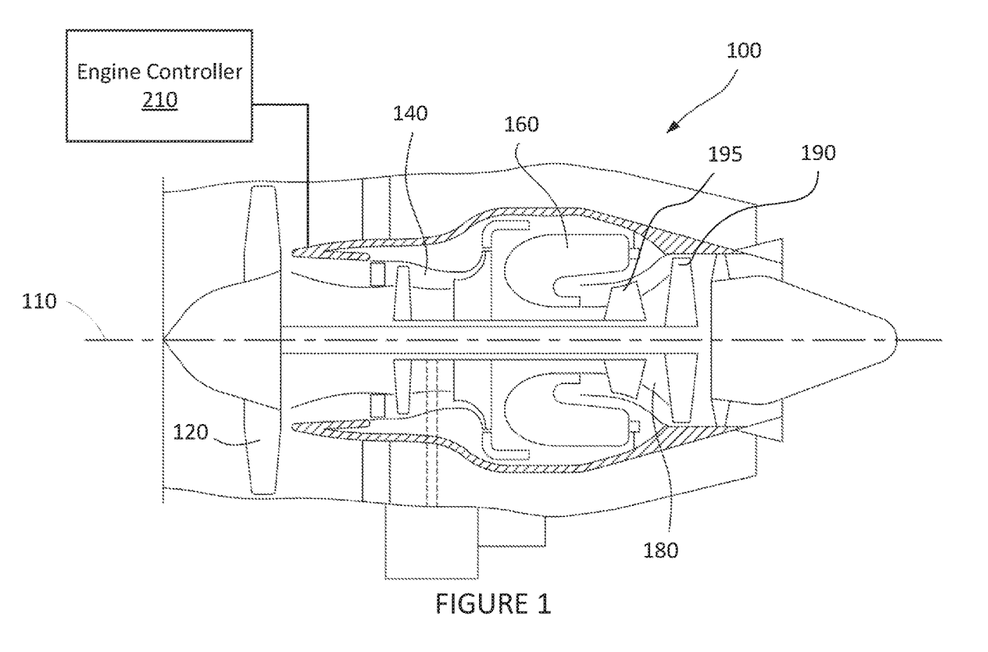
FIG. 1 is a cutaway side elevational view of an example engine, in accordance with one or more illustrative embodiments.

With reference to FIG. 1, there is illustrated a gas turbine engine 100 to which the monitoring methods and systems may be applied. Note that while engine 100 is a turbofan engine, the detection methods and systems may be applicable to turboprop, turboshaft, and other types of gas turbine engines. In addition, the engine 100 may be an auxiliary power unit (APU), an auxiliary power supply (APS), a hybrid engine, or any other suitable type of engine. While the engine 100 is shown as being a gas turbine for an aircraft, it should be noted that the embodiments described herein can apply to any suitable gas turbine engine, including primary engines, auxiliary engines, or to any engine of any suitable vehicle, generator, and the like.

Engine 100 generally comprises in serial flow communication: a fan 120 through which ambient air is propelled, a compressor section 140 for pressurizing the air, a combustor 160 in which the compressed air is mixed with fuel and ignited for generating an annular stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140. It should be noted that other configurations for the engine 100 are also considered.

Control of the operation of the engine 100 can be effected by one or more control systems, for example an engine controller 210. The engine controller 210 can modulate a fuel flow rate provided to the operating engine 100, the position and/or orientation of variable geometry mechanisms within the engine 100, a bleed level of the engine 100, and the like.

Figure 2:
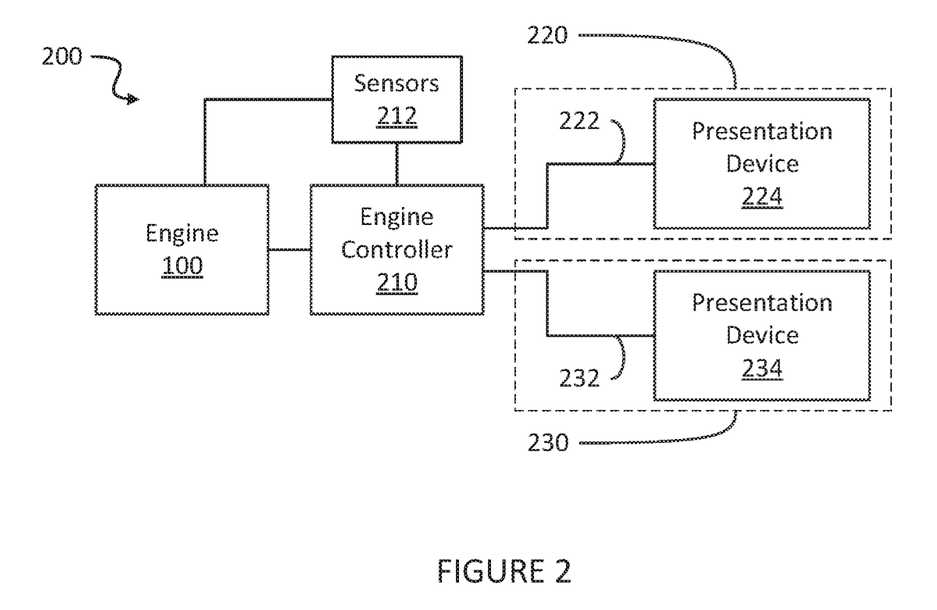
FIG. 2 is a block diagram of an example system for monitoring component integrity, in accordance with one or more illustrative embodiments.

With reference to FIG. 2, there is shown a system 200 for monitoring the integrity of components within an aircraft, for example within the engine 100 of an aircraft. The system 200 is composed of the engine controller 210 and presentation devices 224, 234, each of which is coupled to the engine controller 210 via a corresponding communication link 222, 232. Together, the presentation device 224 and the communication link 222 form a communication path 220 for providing an operator of the aircraft and/or the engine 100 with usage data pertaining to the aircraft and/or to the engine 100. Similarly, the presentation device 234 and the communication link 232 together form a communication path 230.

The communication paths 220, 230 are independent of one another this means that both of the communication links 222, 232, and both of the presentation devices 224, 234 are independent of one another. In the context of the present disclosure, the communication links 222, 232 being independent from one another means that the ability of the communication link 222 to correctly perform tasks is not affected by the state of the communication link 232, and vice-versa. Put differently, a failure of the communication link 232 should not impact the ability of the communication link 222 to perform tasks, and vice-versa. The independence of the presentation devices 224, 234 is similarly implemented, so that failure of the presentation device 234 does not affect the ability of the presentation device 224 to operate, and vice-versa.

The engine controller 210 can be any suitable type of engine controller, including a full-authority digital engine controller (FADEC) or similar device. The engine controller 210 is configured for controlling operation of one or more engines of an aircraft, such as engine 100. The engine controller 210 is also configured for logging various information about aircraft usage and operating conditions. The engine controller 210 can monitor the operation of the engine 100 to determine time of operation, track the power level of the engine 100 over the period of operation, log the occurrence of unexpected events during the period of operation, and the like. In addition, the engine controller 210 can be provided with, or be coupled to, a variety of sensors 212 to allow the engine controller 210 to monitor operating conditions including temperature, pressure, humidity, and the like. In this fashion, the engine controller 210 is capable of evaluating the fatigue of components due to a period of operation, for instance to obtain usage data for components, for instance a count of fatigue cycles.

In some embodiments, the engine controller 210 can measure raw usage data for a particular component, then adjust the raw usage data based on the conditions in which the component was operated. For example, if the component was operated in relatively low temperatures, the raw usage data can be adjusted downward to compensate for the relatively low strain experienced by the component. In another example, if the component was operated in relatively high temperatures, the raw usage data can be reduced only slightly, or not at all. Other adjustments can be performed based on other operating conditions, as appropriate.

The presentation devices 224, 234 can be any suitable type of device for presenting information, for example to an operator of the aircraft. In some embodiments, the presentation devices 224, 234 are independent displays within a cockpit of the aircraft. In some other embodiments, the presentation devices 224, 234 are different windows on a common display, for example first and second windows associated with first and second programs, which are run independently. For instance, the first and second programs can be run as independent threads within a larger system-level program. Other implementations are also considered.

In further embodiments, the presentation devices 224, 234 are independent speakers or other audio systems within the cockpit of the aircraft. In some other embodiments, the presentation devices 224, 234 are independent programs configured for presenting information via a common speaker in the cockpit of the aircraft. In still further embodiments, the presentation devices 224, 234 can be any suitable combination of displays and speakers.

The communication links 222, 232 can be any suitable means for linking the engine controller 210 to the presentation devices 224, 234 which are independent of one another. In some embodiments, the communication links 222, 232 can be wired communication links, for example electrical or optical cables. For instance, the communication links 222, 232 can be two independent circuits which are part of a common device. In other embodiments, the communication links 222, 232 are wireless communication links, for example Bluetooth™, Zigbee™, or the like. Combinations of wired and wireless communication links are also considered. In some embodiments, the communication link 222 can be substantially similar to the communication link 232. In other embodiments, the communication links 222, 232 can be of different types, for example one wired, and one wireless. Other configurations are also considered.

In certain embodiments, the engine controller 210 is assigned a high trust level, for instance FDAL A or FDAL B, suitable for communicating information relating to top-level failure conditions of catastrophic, severe, and/or hazardous levels. As a result, the engine controller 210 is suitable for communicating usage data relating to the integrity of components of an aircraft, such as fatigue cycle counts. The communication links 222, 232 and the presentation devices 224, 234, are assigned a lower trust level than the engine controller 210, for example FDAL B, FDAL C, or FDAL D. Under standard regulatory guidelines, information provided from the engine controller 210 to the presentation devices 224, 234 (via the communication links 222, 232) is assigned the lowest trust level of any component in the path. Therefore, communication between the engine controller 210 and either of the presentation devices 224, 234 is assigned a trust level lower than required for reporting usage data for a period of operation of the aircraft. Put differently, due to the lower trust level of the communication paths 220, 230, whether due to the communication links 222, 232 and/or due to the presentation devices 224, 234, usage data measured by the engine controller 210 cannot be provided to an operator of the aircraft in a regulation-compliant fashion via the communication paths 220, 230.

However, by using two independent mechanisms for transmission of information, an overall communication system can be elevated by one trust level over the lowest trust level of the constituent components of the communication system. Thus, by providing two independent communication paths 220, 230, which transmit information from the engine controller 210 to two independent presentation devices 224, 234 via two independent communication links 222, 232, the higher trust level of the engine controller 210 can be maintained throughout the system 200. In this fashion, usage data can be transmitted from the engine controller 210 to an operator while maintaining an appropriate trust level, meeting regulatory requirements.

For example, regulations may require a trust level of FDAL A to properly report usage data. An example aircraft has an EECS of trust level FDAL A, a first cockpit screen having an trust level FDAL B and a second, independent cockpit screen having a trust level FDAL B. The EECS is coupled to the first and second cockpit screens via independent electrical wires, which are of trust level FDAL B. Although the cockpit screens and electrical wires are only of trust level FDAL B, because two independent pathways are used to report the information provided by the EECS, the trust level of the cockpit screens and electrical wires is elevated to FDAL A, thereby maintaining the trust level required for electronic reporting of usage data. Other regulations may require different trust levels for reporting usage data, and the trust levels of the communication links 222, 232 and the presentation devices 224, 234 can be varied as a function of regulatory requirements.

Although the foregoing discussion has focused on providing the usage data to an operator using displays and/or speakers within the cockpit of the aircraft, it should be noted that other approaches are considered. For example, an operator can be located outside the aircraft, for instance in proximity to the engine 100 of the aircraft, and can use one or more handheld devices to query the engine controller 210 to obtain the usage data. The handheld devices can be wiredly or wirelessly coupled to the engine controller 210, forming the communication links 222, 232. Still other approaches are also considered.

It should also be noted that the usage data, as provided to the operator of the aircraft, are considered accurate when they are substantially identical. An operator provided with differing usage data via the presentation devices 224, 234 may be required to use the more conservative of the two measurements, or may be required to discard the measurements and instead use a value based on time of flight or a similar metric. In some embodiments, the manufacturer, regulator, or other authority can impose a maximum value for the discrepancy between the usage data as presented to the operator via the presentation devices 224, 234.

Figure 3:
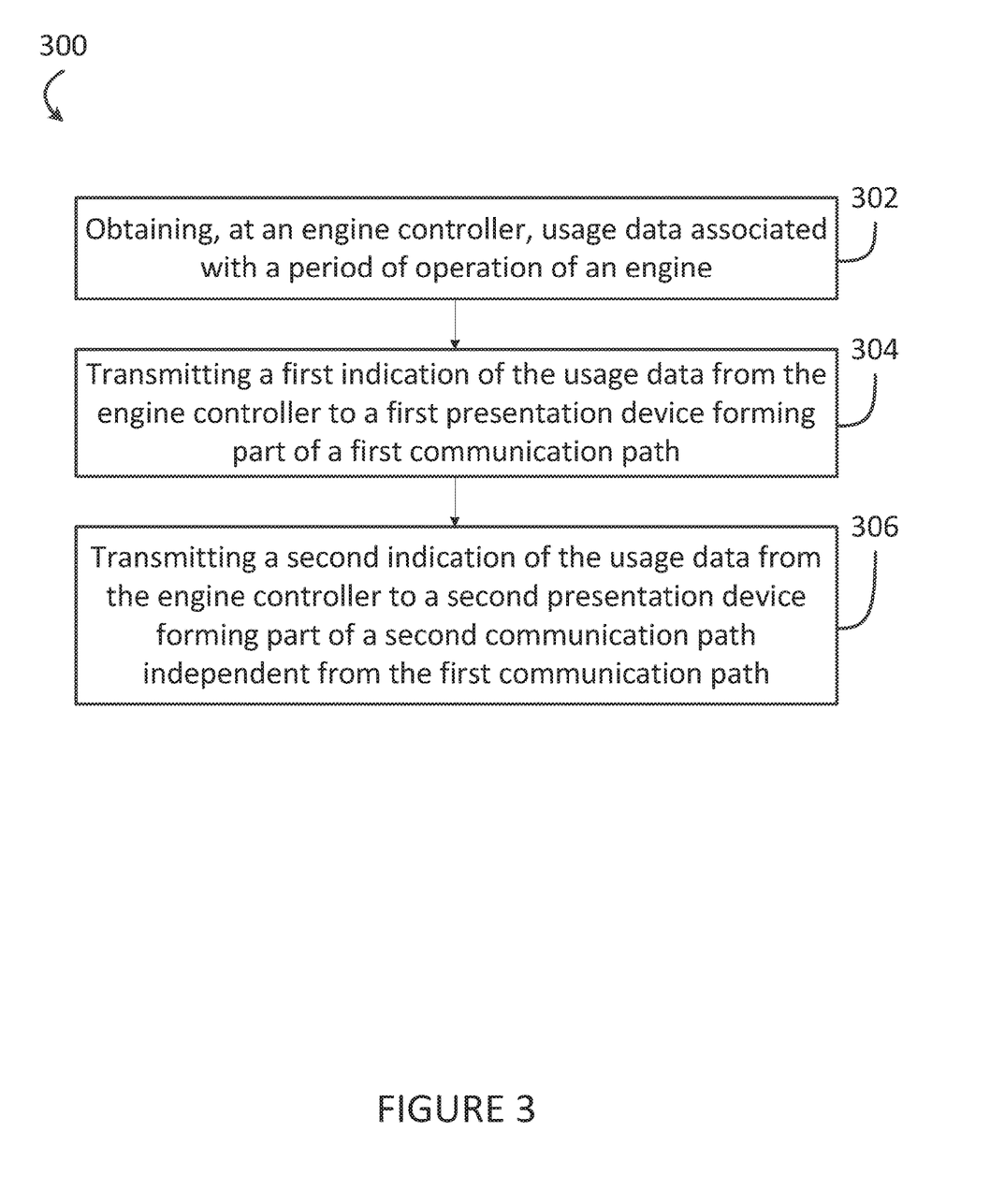
FIG. 3 is a flowchart of an example method for monitoring component integrity, in accordance with one or more illustrative embodiments.

With reference to FIG. 3, there is shown a method 300 for monitoring component integrity during operation of an engine, for instance the engine 100. At step 302, usage data associated with a period of operation of the engine 100 is obtained at an engine controller, for instance the engine controller 210. In some embodiments, the engine controller 210 is configured for adjusting raw usage data based on the operating conditions to which the component was subjected. For instance, the raw usage data can be adjusted based on an operating temperature, pressure, speed, or similar characteristic. In some embodiments, the engine controller 210 collects information about the operating conditions of the engine during a period of operation of the engine, and when the period of operation is terminated, compiles the usage data based on the duration of the period of operation and the operating conditions, as appropriate. The usage data can relate to a component of the engine 100, to a component outside the engine, for instance a component of an aircraft to which the engine is coupled, or to any other suitable component.

At step 304, a first indication of the usage data is transmitted to a first presentation device, for instance the presentation device 224, which forms part of a first communication path, for instance the communication path 220. The first presentation device 224 is coupled to the engine controller 210 via a first communication link, for instance the communication link 222. The indication of the usage data can be any suitable representation of the usage data, using any suitable numbering scheme and any suitable units. For example, the indication can be an absolute number representing the number of fatigue cycles experienced by the component. In another example, the indication is a percent value indicating what proportion of the life cycle of the component was consumed during operation, or indicating what proportion of the life cycle of the component remains following operation. Other implementations are also considered.

At step 306, a second indication of the usage data is transmitted to a second presentation device, for instance the presentation device 234, which forms part of a second communication path, for instance the communication path 230. The second presentation device 234 is coupled to the engine controller 210 via a second communication link, for instance the communication link 232. The second indication can be any suitable representation of the usage data, which can be different from the first indication, or substantially similar thereto. The second communication path 230 is independent from the first communication path 220.

Once the first and second indications are transmitted to the first and second presentation devices 224, 234, the first and second presentation devices 224, 234 can present the indications, for example to an operator of the aircraft. In some embodiments, the first and second indications are presented substantially simultaneously or concurrently. In other embodiments, the first and second indications are presented sequentially. Other embodiments are also considered. The operator can then confirm whether the first and second indications are sufficiently similar and make use of the usage data as required by regulations.

For example, the operator confirms whether the first and second indications match sufficiently, for instance within a predetermined threshold. The predetermined threshold can be set by a manufacturer, regulator, or other suitable authority. The operator can then determine whether the usage data indicates that a maintenance operation must be performed. For instance, the operator can determine, based on established guidelines, whether a particular component of the engine 100 needs to be repaired, replaced, or the like, or if the engine 100 needs to be serviced in any other suitable fashion. In another example, when the first and second indications of the usage data sufficiently match, the operator can assign a lifecycle status to the engine 100, or to one or more components thereof. The lifecycle status can indicate a remaining lifespan of the component, a degree to which maintenance is required, a priority level for maintenance or repair, and the like. Other operator actions are also considered.

Figure 4:
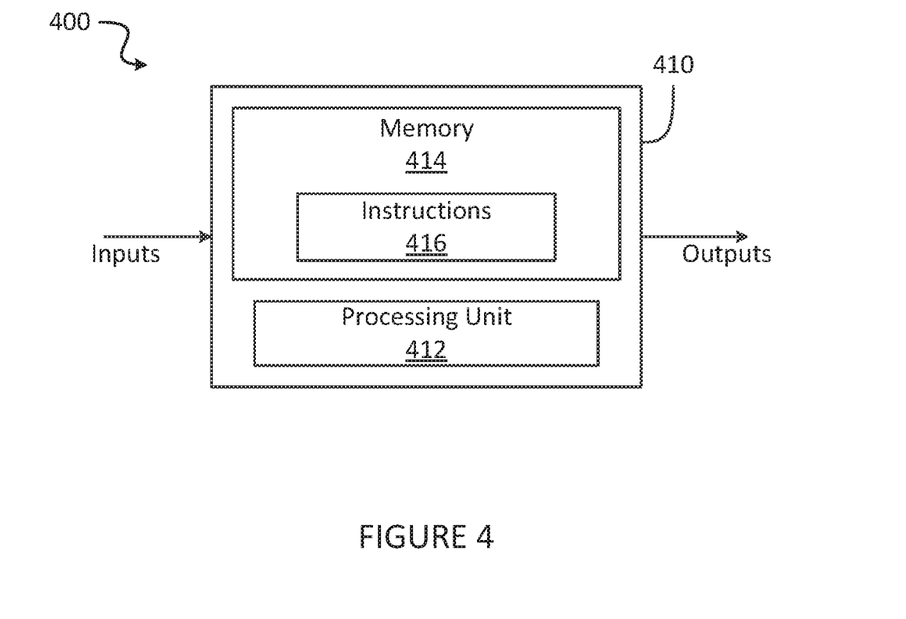
FIG. 4 is block diagram of an example computing device for implementing the method of FIG. 3, in accordance with one or more illustrative embodiments.

With reference to FIG. 4, the method of FIG. 3 may be implemented by a computing device 410 as an embodiment of the engine controller 210. The computing device 410 comprises a processing unit 412 and a memory 414 which has stored therein computer-executable instructions 416. The processing unit 412 may comprise any suitable devices configured to implement the functionality of the engine controller 210 such that instructions 416, when executed by the computing device 410 or other programmable apparatus, may cause the functions/acts/steps performed by the engine controller 210 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

It should be noted that the computing device 410 may be implemented as part of a FADEC or other similar device, including electronic engine control (EEC), engine control unit (EUC), engine electronic control system (EECS), and the like. In some embodiments, engine controller 210 is implemented as a dual-channel FADEC. In some other embodiments, the engine controller 210 can be two separate EECS, each configured to transmit a respective one of the indications to a respective one of the presentation devices 224, 234, via a respective one of the communication links 222, 232. In addition, it should be noted that the techniques described herein can be performed by the engine controller 210 substantially in real-time.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for monitoring component integrity during operation of an engine, comprising:
    obtaining, at an engine controller, usage data associated with a period of operation of the engine, the engine controller having assigned thereto a first trust level;
    transmitting a first indication of the usage data from the engine controller to a first presentation device forming part of a first communication path, the first communication path having assigned thereto a second trust level lower than the first trust level; and
    transmitting a second indication of the usage data from the engine controller to a second presentation device forming part of a second communication path independent from the first communication path and having assigned thereto the second trust level;
    wherein the trust level of the first and second communication paths is elevated by having the usage data transmitted through the first and second independent communication paths.

2. The method of claim 1, wherein transmitting the first indication to a first presentation device comprises transmitting the first indication to a first screen in a cockpit of an aircraft.

3. The method of claim 2, wherein transmitting the second indication to a second presentation device comprises transmitting the second indication to a second screen in the cockpit of the aircraft.

4. The method of claim 1, wherein transmitting the first indication to a first presentation device comprises transmitting the first indication to a handheld device.

5. The method of claim 1, wherein transmitting the first indication to a first presentation device comprises transmitting the first indication to a speaker in a cockpit of an aircraft.

6. The method of claim 1, wherein the usage data comprises a count of fatigue cycles for a component of the engine.

7. The method of claim 1, wherein the usage data comprises a count of fatigue cycles for a component of an aircraft to which the engine is coupled.

8. A system for monitoring component integrity during operation of an engine, comprising:
a processing unit; and
a non-transitory computer-readable medium coupled to the processing unit and having stored thereon instructions executable by the processing unit for:
obtaining, at an engine controller, usage data associated with a period of operation of the engine, the engine controller having assigned thereto a first trust level;
transmitting a first indication of the usage data from the engine controller to a first presentation device forming part of a first communication path, the first communication path having assigned thereto a second trust level lower than the first trust level; and
transmitting a second indication of the usage data from the engine controller to a second presentation device forming part of a second communication path independent from the first communication path and having assigned thereto the second trust level;
wherein the trust level of the first and second communication paths is elevated by having the usage data transmitted through the first and second independent communication paths.

9. The system of claim 8, wherein transmitting the first indication to a first presentation device comprises transmitting the first indication to a screen in a cockpit of an aircraft.

10. The system of claim 8, wherein transmitting the second indication to a second presentation device comprises transmitting the second indication to a second screen in the cockpit of the aircraft.

11. The system of claim 8, wherein transmitting the first indication to a first presentation device comprises transmitting the first indication to a handheld device.

12. The system of claim 8, wherein transmitting the first indication to a first presentation device comprises transmitting the first indication to a speaker in a cockpit of an aircraft.

13. The system of claim 8, wherein the usage data comprises a count of fatigue cycles for a component of the engine.

14. The system of claim 8, wherein the usage data comprises a count of fatigue cycles for a component of an aircraft to which the engine is coupled.

15. An assembly for monitoring component integrity of an engine, comprising:

a first communication link, the first communication link having assigned thereto a first trust level;
a second communication link independent from the first communication link and having assigned thereto the first trust level; and
an engine controller coupled to the first and second communication links, respectively, the engine controller having assigned thereto a second trust level higher than the first trust level, the engine controller configured for
monitoring usage data during operation of the engine;
transmitting a first indication of the usage data over the first communication link; and
transmitting a second indication of the usage data over the second communication link.

16. The assembly of claim 15, further comprising
a first presentation device having assigned thereto the first trust level, wherein the first presentation device and the first communication link form a first communication path; and
a second presentation device independent from the first presentation device and having assigned thereto the first trust level, wherein the second presentation device and the second communication link form a second communication path independent from the first communication path.

17. The assembly of claim 16, wherein the first presentation device comprises one of a screen in a cockpit of an aircraft, a speaker in the cockpit of the aircraft, and a handheld device.

18. The assembly of claim 15, wherein the engine controller is further configured for, subsequent to transmitting the first and second indications of the usage data, receiving a request for maintenance at the engine controller.

19. The assembly of claim 18, wherein the engine controller is further configured for, responsive to receiving the request for maintenance, issuing a subsequent request for maintenance of a particular component of the engine.

20. The assembly of claim 15, wherein the engine controller is further configured for, subsequent to transmitting the first and second indications of the usage data, receiving a lifecycle status for the engine based on the usage data.

* * * * *